H. H. DURR.
VEHICLE TIRE.
APPLICATION FILED MAR. 29, 1911.
1,018,814.
Patented Feb. 27, 1912.
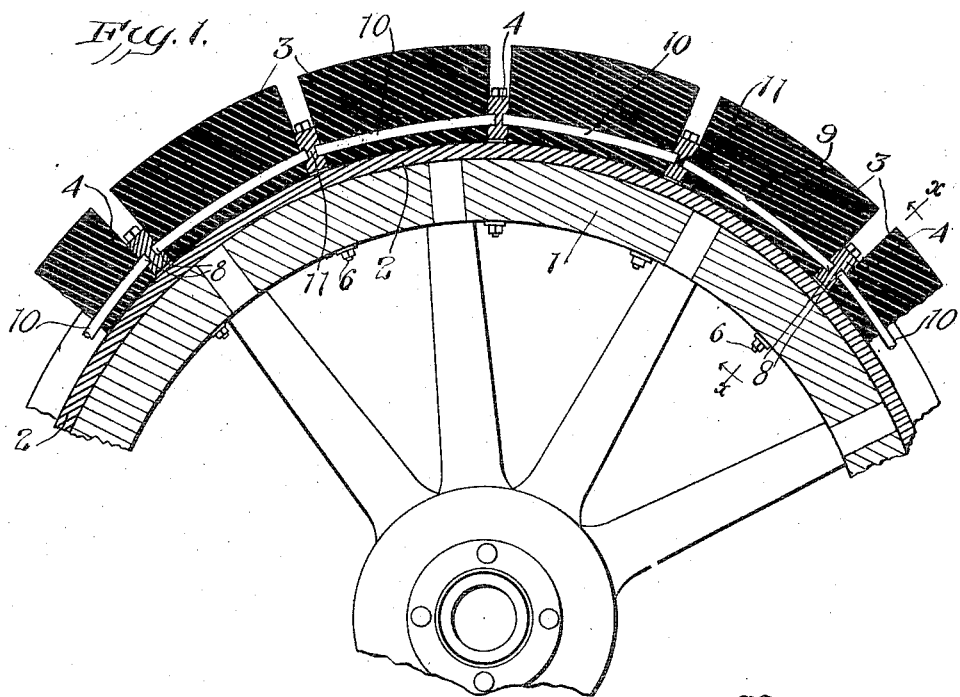
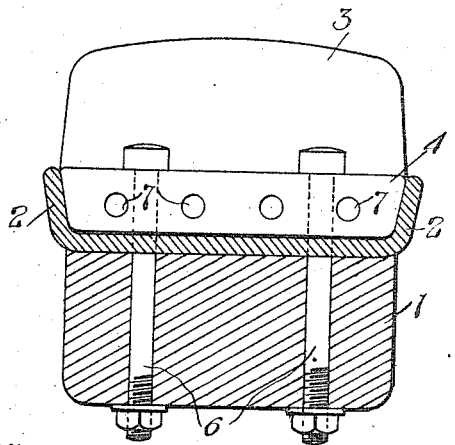
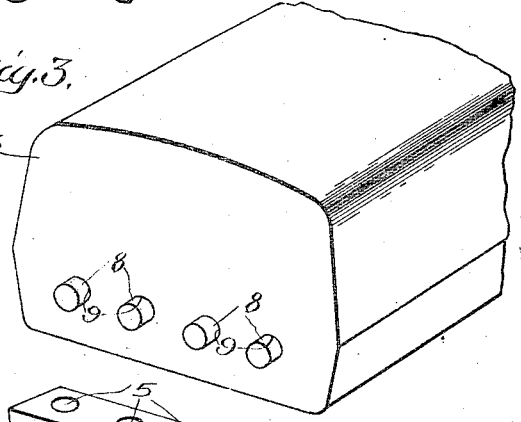
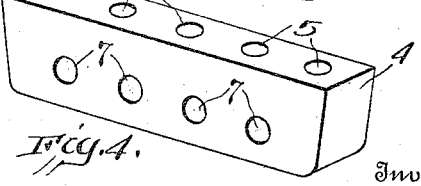
Witnesses
G. Howard Walmsley
Harriet L. Hammaker
Inventor
Henry H. Durr,
By Toulmin & Reed
Attorneys

UNITED STATES PATENT OFFICE.

HENRY H. DURR, OF SPRINGFIELD, OHIO.

VEHICLE-TIRE.

1,018,814.  Specification of Letters Patent.  Patented Feb. 27, 1912.

Application filed March 29, 1911. Serial No. 617,748.

*To all whom it may concern:*

Be it known that I, HENRY H. DURR, a citizen of the United States, residing at Springfield, in the county of Clark and State of Ohio, have invented certain new and useful Improvements in Vehicle-Tires, of which the following is a specification, reference being had therein to the accompanying drawing.

This invention relates to vehicle tires and more particularly to sectional tires for use on power driven trucks.

The object of the invention is to provide a tire of this character having the sections or blocks entirely separate and interchangeable and having fastening devices which will securely fasten the blocks to the rim of the wheel, which will permit any one of the blocks to be removed without disturbing or loosening more than one other block, and which will permit the ends of adjacent sections to be spaced apart minimum distances.

In the accompanying drawings, Figure 1 is a side elevation of a portion of a wheel equipped with my invention and showing the rim and tire in section; Fig. 2 is a transverse, sectional view of the same on the line $x\ x$ of Fig. 1 and looking in the direction of the arrows; Fig. 3 is a detail view of one end of one of the blocks; and Fig. 4 is a detail view of one of the cross bars.

In these drawings I have illustrated one embodiment of my invention and have shown the same as applied to a wheel of ordinary construction having a rim 1 on which is mounted the usual channel iron 2 to receive the tire and hold the same against lateral displacement. Mounted in the channel iron 2 are a series of tire sections or blocks 3 which may be formed of rubber composition or any suitable material. These blocks are formed separate one from the other and have their ends spaced apart substantially equal distances throughout their entire area, that is, they are not provided with projections or flanges of the material of the block to coöperate with clamping devices to secure the same to the rim. Suitable fastening devices are rigidly secured to the channel iron between the ends of adjacent blocks and these ends of the blocks are then secured to the fastening devices in such a manner as to effectually prevent any movement of the block relatively to the rim. The character of these fastening devices is such as to permit the ends of adjacent blocks to be spaced apart minimum distances. Preferably, the fastening devices comprise cross bars 4 of a length and height approximately equal to the width and depth of the channel iron. Each cross bar is provided with two or more bolt holes, as indicated at 5, to receive bolts 6, by means of which they are secured to the channel 2 in the rim 1. In the present instance I have shown the cross bars as having five bolt holes. In securing the bar to the rim only two, or possibly three, of these holes will be utilized, but by providing this number of holes arranged in the manner shown, any cross bar can be secured to the rim at any point regardless of whether or not the point of connection is between spokes or in alinement with a spoke. Each cross bar has formed in each side thereof a plurality of recesses 7 to receive lugs or projections 8 secured to the blocks. These lugs may be of any suitable character and may be secured to the blocks in any manner which will have the requisite amount of strength, but I have here shown one manner of providing the lugs which I have found highly efficient. Each block is provided with a series of longitudinal apertures extending entirely through the same, as indicated at 9, and, in these apertures, I have mounted wires or rods 10 which fit snugly therein and are of a length greater than the blocks, thus causing the ends of the wires to project beyond the corresponding ends of the blocks and form the lugs or projections 8 which enter the recesses 7 of the cross bar. The recesses in the cross bars are preferably provided with stops to prevent any creeping of the wires 10, that is, any longitudinal movement thereof relatively to the blocks. As here shown the corresponding apertures in the opposite sides of the cross bars are arranged in alinement, but each aperture is of a depth slightly less than half the width of the bar, thus forming between the two recesses a thin partition 11 which forms a stop to prevent any longitudinal movement of the wire relatively to the bar. The apertures in which the wires are mounted are preferably formed near the bases of the blocks. Little or no movement is imparted to the material of this portion of the block when the tire is in service. Consequently, there is practically no friction between the wires and the walls of the apertures and little or no tendency of the apertures to become enlarged.

It will be noted that each section or block of the tire is secured to the rim at each end by a separate fastening device and that this fastening device is connected with but one other block of the tire. It will be obvious, therefore, that should any block become worn and should it for any reason be desirable to remove the same it is only necessary to loosen the bolts 6 of the cross bar at one end of the block and move the bar and the ends of the blocks upward until the projections carried by the blocks can be disengaged from the bar. It is then possible to remove the defective block, substitute another therefor and quickly return both blocks to their positions on the rim and firmly secure the same thereon. The cross bars also materially facilitate the assembling of the tire in much the same manner as they make it possible to remove the individual blocks thereof. By bolting alternate cross bars to the rim the tire can be very quickly assembled by inserting the projections at opposite ends of two blocks in the apertures of such alternate cross bars, placing the intermediate cross bar between the adjacent ends of said blocks, moving the blocks into position on the rim and bolting the cross bar to the rim. It will also be noted that the cross bars are of a comparatively narrow width and permit the ends of adjacent sections to be arranged comparatively close together, avoiding the wide spaces between the blocks frequently found in sectional tires.

It will also be apparent that by forming the blocks entirely separate one from the other, rigidly securing the fastening devices in the channel between the ends of adjacent blocks and then rigidly but detachably securing the ends of said blocks to said fastening devices I have provided a highly efficient sectional tire which can be readily assembled, and, when assembled, will form a practically continuous tire, the spaces between the sections being very small; which will permit of the ready removal and replacing of any of the sections without disturbing or loosening more than one other section; which will permit the blocks to be staggered when applied to dual wheels; and which is of a very strong durable character.

While I have illustrated one form of my invention by means of which these results are attained I wish it to be understood that I do not desire to be limited to the details of construction shown and described, for obvious modifications will occur to a person skilled in the art.

Having thus fully described my invention, what I claim as new and desire to secure by Letters Patent, is:—

The combination, with a wheel rim, and a channel iron secured thereto, of a plurality of blocks mounted in said channel iron and spaced one from another, each of said blocks having its end surface substantially flat and arranged at substantially right angles to said rim, a plurality of longitudinal wires mounted in each of said blocks and extending beyond the opposite ends thereof, cross bars, of a length and height approximately equal to the width and depth, respectively, of said channel, mounted in said channel between the ends of adjacent blocks and having recesses in both sides thereof to receive the projecting ends of said wires, each of said bars having a longitudinally arranged series of radial apertures extending through the same, and a plurality of bolts extending through each of said bars and through said channel iron and said rim, said bolts being less in number than said apertures and each bolt being adapted to extend through any one of said apertures.

In testimony whereof, I affix my signature in presence of two witnesses.

HENRY H. DURR.

Witnesses:
E. O. HAGAN,
HARRIET L. HAMMAKER.